United States Patent [19]
Gledhill et al.

[11] Patent Number: 5,345,440
[45] Date of Patent: Sep. 6, 1994

[54] RECEPTION OF ORTHOGONAL FREQUENCY DIVISION MULTIPLEXED SIGNALS

[75] Inventors: Jeffrey J. Gledhill, Chandlers Ford; Santosh V. Anikhindi, Southampton; Peter A. Avon, Peterfield, all of England

[73] Assignee: National Transcommunications Limited, Winchester, England

[21] Appl. No.: 934,653

[22] PCT Filed: Sep. 13, 1991

[86] PCT No.: PCT/GB91/01571
§ 371 Date: Jan. 7, 1993
§ 102(e) Date: Jan. 7, 1993

[87] PCT Pub. No.: WO92/05646
PCT Pub. Date: Apr. 2, 1992

[30] Foreign Application Priority Data
Sep. 14, 1990 [GB] United Kingdom ............ 9020170

[51] Int. Cl.$^5$ ........................ H04J 1/00; H04J 11/00
[52] U.S. Cl. ........................ 370/19; 370/23; 370/69.1; 375/120
[58] Field of Search ............ 370/19, 20, 21, 23, 370/69.1, 121, 122; 375/119, 120, 83; 364/725, 726

[56] References Cited

U.S. PATENT DOCUMENTS

| | | | |
|---|---|---|---|
| 4,884,139 | 11/1989 | Pommier | 358/142 |
| 5,166,924 | 11/1992 | Moose | 370/32.1 |
| 5,197,061 | 3/1993 | Halbert-Lassalle et al. | 370/19 X |

FOREIGN PATENT DOCUMENTS

0321021 6/1989 European Pat. Off.
61-129936 10/1986 Japan.

OTHER PUBLICATIONS

Hirosaki et al., "Advanced Groupband Data Modem Using Orthogonally Multiplexed QAM technique," Jun. 1986, pp. 587–592, IEEE Transactions on Communications, vol. 34, No. 6.

Le Floch et al., "Digital Sound Broadcasting to Mobile Receivers," Aug., 1989, pp. 493–503, IEEE Transactions on Consumer Electronics, vol. 35, No. 3.

Primary Examiner—Douglas W. Olms
Assistant Examiner—Melvin Marcelo
Attorney, Agent, or Firm—Watson Cole Grindle & Watson

[57] ABSTRACT

In an OFDM signal individual OFDM carriers are modulated by samples of signals which can only take a limited range of allowed values and a block of samples modulates the group of carriers during a time period T. In a receiver, the signal modulating an individual OFDM carrier may be demodulated by estimating the position of reference axes serving as the frame of reference against which the allowed modulating values are defined, and multiplying the value of the demodulated samples by the complex conjugate of a point on one of the estimated reference axes. The spread of the groups of samples demodulated from each OFDM carrier gives an indication of whether the receiver is synchronised to the block boundaries. Preferably spread of the complex samples is evaluated in the radial direction only and used to steer the sample clock frequency. Phase drift of the demodulated samples from one block to the next indicates the degree of local oscillator frequency error. Preferably phase drift is assessed by multiplying complex values by the complex conjugate of an earlier sample demodulated from the same OFDM carrier and using the resulting measure to steer the local oscillator frequency via a frequency locked loop.

17 Claims, 11 Drawing Sheets

E.G. INITIAL STATE = +1+j

| DATA | TRANSITION | FINAL STATE |
|------|------------|-------------|
| 00   | 0°         | +1+j        |
| 10   | 90°        | -1+j        |
| 11   | 180°       | -1-j        |
| 01   | 270°       | +1-j        |

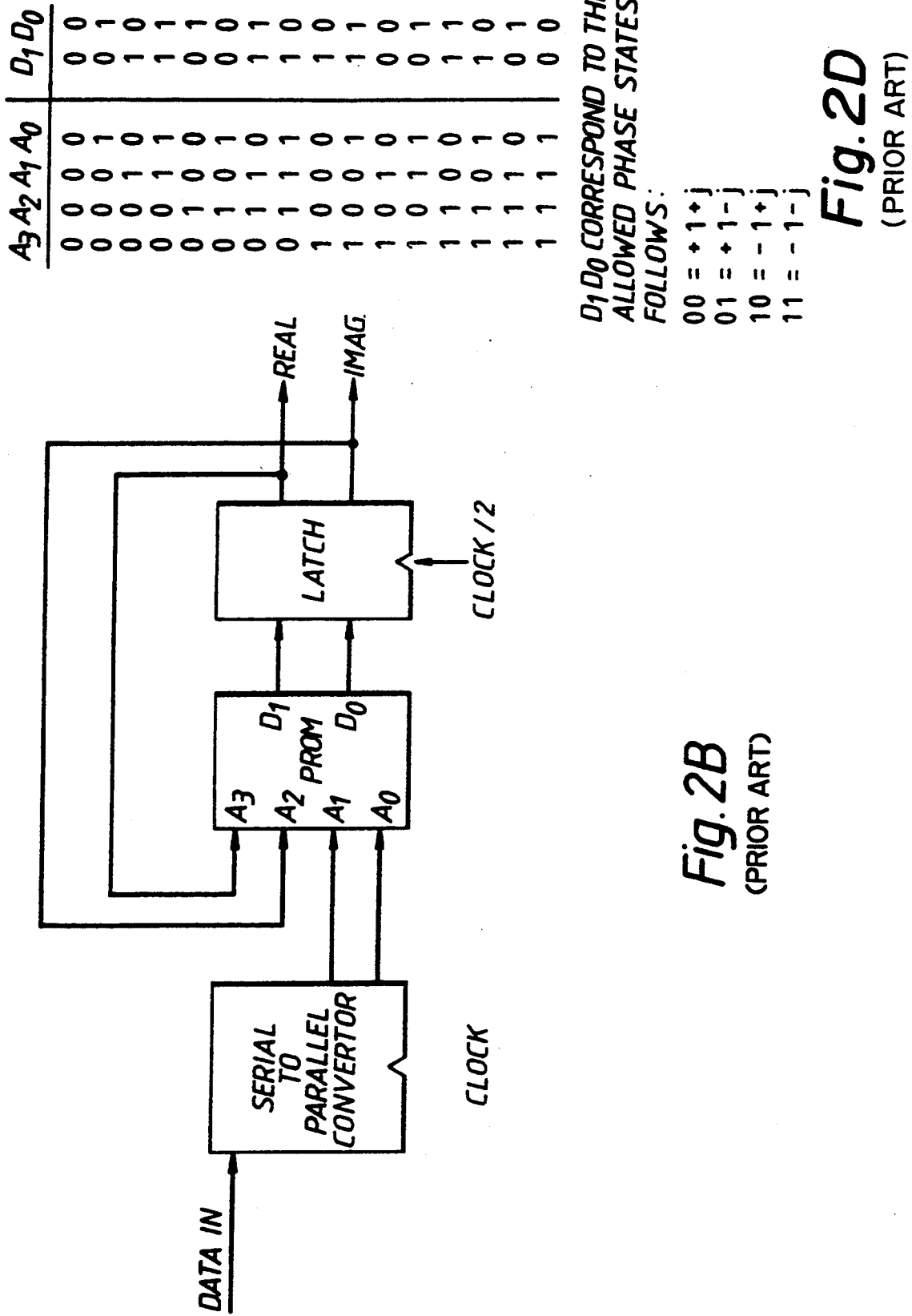

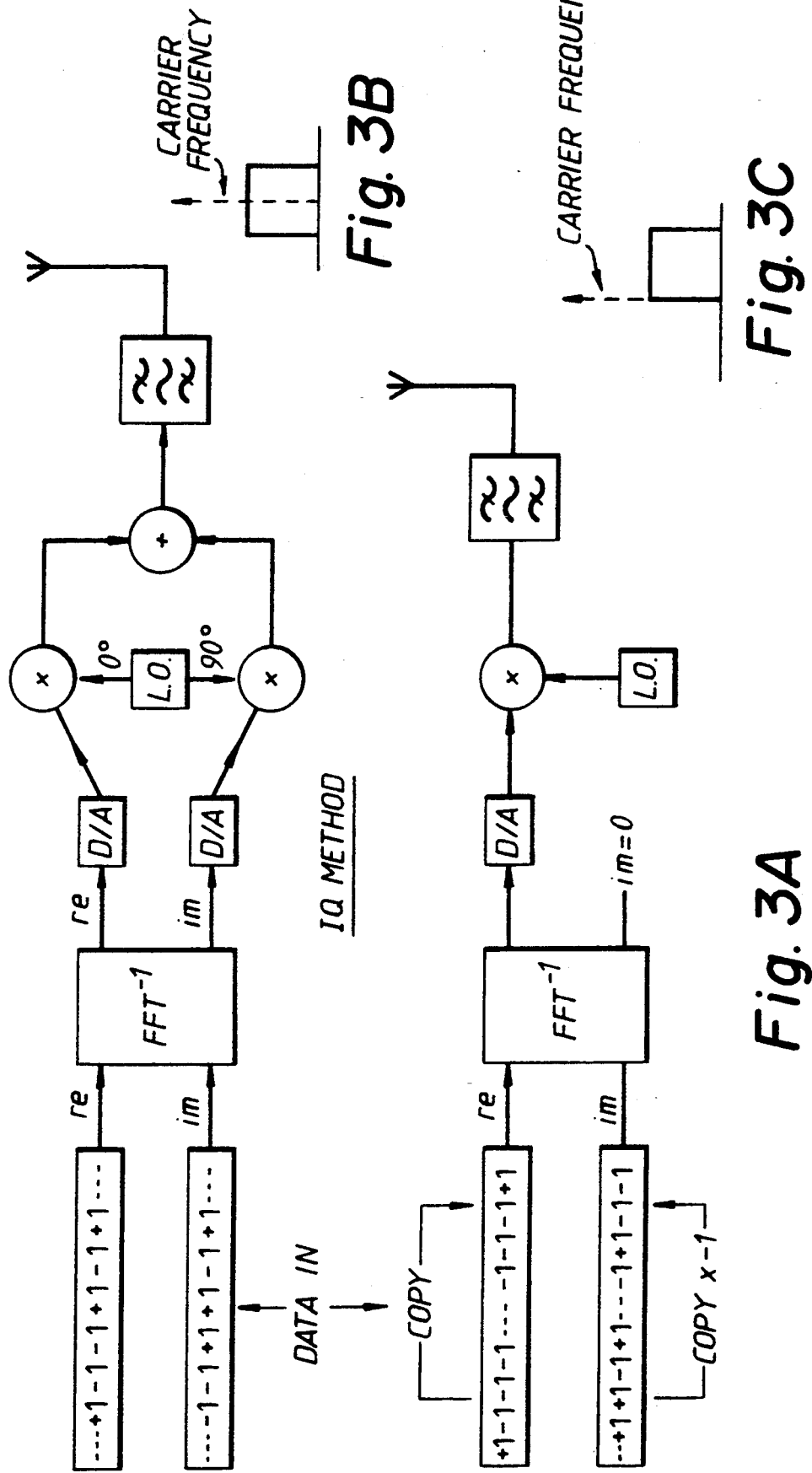

RECEPTION OF ORTHOGONAL FREQUENCY DIVISION MULTIPLEXED SIGNALS

BACKGROUND OF THE INVENTION

1. Field of the Invention

The present invention relates to the field of reception of orthogonal frequency division multiplexed (OFDM) signals. More particularly, the invention concerns demodulation of received OFDM signals and synchronisation at an OFDM receiver.

2. Description of The Prior Art

Orthogonal frequency division multiplexing is a method of transmitting data which is being investigated, because of its good interference properties, for use in the UHF band.

In the discussion that follows it is assumed that an inverse Discrete Fourier Transformation is used to generate the OFDM signal.

In general it will be necessary to modulate a generated OFDM signal onto a carrier so as to reach an appropriate frequency for transmission. By adapting the processing which is performed in the frequency domain it becomes possible to simplify the modulation of the OFDM signal onto a carrier. This is described in our co-pending International patent application No. PCT/GB91/00513.

In order to recover data from a received OFDM signal which has been modulated onto a carrier it is necessary to demodulate the OFDM signal from the carrier onto which it is modulated before demodulating data from the individual OFDM carriers. Embodiments of the present invention may deal with one or both of these types of demodulation.

As with more conventional methods of data transmission, with OFDM signals it is necessary to synchronise the receiver to the transmission before useful data can be recovered. The normal way of achieving this is by using special framing signals, however this represents an overhead on the available bit rate and may compromise the interference properties of the signal.

It has also been proposed, in the article "Digital Implementation of High Speed HF Modems" by D. Harmer and B. Hillam, to synchronise a receiver to the block start positions in a received OFDM signal by integrating each received modulated OFDM carrier and, because there should be an integer number of cycles occurring during one block, a non-zero value for the integral will indicate block misalignment.

Embodiments of the present invention may deal with any or all of block synchronisation, sample clock synchronisation and, where relevant, local oscillator synchronisation, without the need to use special framing signals, by looking at the distribution of the demodulated sample values.

As shown in FIG. 1, an orthogonal frequency division multiplexed (OFDM) signal consists of a large number of carriers each of which is modulated by a signal whose level varies discretely rather than continuously and thus the resulting power spectrum of each carrier follows a $(\text{Sin } x/x)^2$ distribution. The symbol rate of the modulating signals, and the carrier frequencies, are such that the peak of power of each modulated carrier occurs at frequencies corresponding to nulls in the power spectrum of the other modulated carriers. The carrier spacing is equal to the reciprocal of the symbol rate of each modulating signal (assuming that all of the modulating signals have the same symbol rate).

The overall spectrum of the OFDM signal is very close to rectangular when a large number of carriers are contained in the OFDM signal.

During a given time period, T, the OFDM signal may be represented by a block of N samples. The value of the kth sample is, as follows:

$$x(k) = \sum_{n=0}^{N-1} X(n) e^{2jnK/N}$$

The N values $X(n)$ represent the respective values, during period T, of the discretely-varying signals modulating the OFDM carriers $e^{2jnk/N}$.

It may be seen from the above equation that the OFDM signal corresponds to the inverse Discrete Fourier Transform of a set of data samples, $X(n)$. Thus, a stream of data may be converted into an OFDM signal by splitting the data stream up into blocks of N samples $X(n)$ and subjecting each block of data samples to an inverse Discrete Fourier Transform.

The succession of data samples, $X(n)$, which appear at a particular sample position over time constitute a discretely-varying signal which modulates a carrier at a frequency, $f_n$.

SUMMARY OF THE INVENTION

According to the present invention it is preferred to have only a restricted set of values which the samples $X(n)$ may take, the set of values representing a set of phase states and amplitudes to be imparted to carriers, $f_n$. In particularly preferred embodiments of the invention the set of values to which the samples $X(n)$ are restricted comprises values $+1+j$, $+1-j$, $-1+j$, and $-1-j$. This set of values corresponds to four allowable equally spaced phase states for the modulated carriers $f_n$, with the same amplitude. Thus, the modulation of each carrier, $f_n$, in these embodiments amounts to quadrature phase shift keying (QPSK). QPSK has the advantage of simplicity and good performance. Further advantages may be gained by differentially coding the data (this avoids the need for carrier references). An OFDM signal produced in this way will also tolerate non-phase-equalised channels much better than would conventional signals.

Since the data samples contained in a stream of data to be transmitted will not necessarily be restricted to taking one of four possible values it is necessary to use an indirect process to code the input data into the four allowed sample values $\pm 1 \pm j$. One way of doing this is to first convert the input data into a binary bitstream and then to code each 2-bit portion of the bitstream into one of the four allowed values. Thus when converting a digital datastream into an OFDM signal, in which each OFDM carrier is QPSK modulated as described above, the datastream may be broken up into blocks 2N bits long and then each group of 2 bits may be coded into one of the four values $\pm 1 \pm j$. The resulting array of complex values for one block is then subjected to an inverse Discrete Fourier Transform so as to produce the OFDM signal.

A consequence of using QPSK modulation of the carriers in the OFDM signal is that only two bits of data are "modulated onto" each carrier per inverse Discrete Fourier Transform. Without increasing the number of Fourier transformations this bit rate can be increased by increasing the number of allowed phase states and/or allowed amplitudes of the modulated carrier. For example, alternative methods of modulating the individual OFDM carriers, such as 8-PSK or 16 QAM could be used. However, the greater the number of allowed phase states the more sensitive the OFDM signal is to noise and to channel distortions. Also, if when producing an OFDM signal portion representing a single block of data different carriers can have different sizes of amplitude, then the overall spectrum of that OFDM signal portion may not be rectangular.

OFDM has several important advantages over more conventional modulation techniques. Among these are:

1) Comprehensive immunity from multipath interference—this arises because the symbol time is long compared to the time between typical echoes.

2) Efficient spectrum usage—The rectangular OFDM spectrum can very nearly fill a channel. This allows it to achieve close to the theoretical maximum data rate, e.g. 2 bits/second/Hz for QPSK. Conventional digital modulation schemes require wider bandwidths because of practical difficulties in implementing suitable filters.

3) Good interference properties—It is possible to modify the OFDM spectrum to take account of the distribution of power in the spectrum of an interfering signal. As described in corresponding International patent application PCT/GB91/00513, in the case of PAL television signals most of the power is concentrated around the vision and sound carriers. When using OFDM signals for TV near existing channels, setting the OFDM carriers to zero near these vision and sound carriers frequencies results in a spectrum with rectangular holes and a dramatic improvement in bit error rate caused by PAL co-channel interference. It is also possible to reduce adjacent channel interference by not using carriers near to the channel edges.

In one aspect the present invention provides methods and apparatus for demodulating data modulated onto OFDM carriers via sample values taking one of four possible phase values, the demodulation using a Discrete Fourier Transformation or an inverse Discrete Fourier Transformation to recover sample values, a complex multiplication and a decoding of the sign of the real and imaginary parts of the resultant signal into first and second data bits respectively.

When demodulating data from an OFDM signal in which the OFDM carriers are modulated by sample values which are restricted to taking one of four phases (regardless of whether or not they are also restricted in amplitude) the sample values output from the DFT, in a complex vector representation, appear as four group of points spaced roughly 90° from one another and 45° from a set of reference axes derived from the received signal. To demodulate an individual sample value it is necessary to determine in which of four quadrants formed by the reference axes the sample lies—this requires comparing the phase angles of the sample with those of the reference axes. Although in theory it would be possible to recover the phase angle information by making use of the fact that the ratio of the imaginary component to the real component of the sample value gives the inverse tangent of the phase angle, this would mean that the sample demodulation process would involve the performance of a division followed by reference to a look-up table. Division is difficult to implement in digital signal processing apparatus and would require a large amount of processing power.

It is possible to reduce the amount of processing required during demodulation of data relating to one OFDM carrier by multiplying the recovered sample values for that carrier by the complex conjugate of a point appearing on the reference axes; the quadrant into which the resultant signal falls determines two bits of decoded data (whether or not further bits of data are obtainable from a consideration of the amplitude of the sample value).

In another aspect the present invention provides methods and apparatus for synchronising a receiver to a received OFDM signal.

Where successive portions of the OFDM signal represent respective successive blocks of data modulating the OFDM carriers, an advantageous method for synchronising the receiver to the block boundaries in the signal involves evaluating the spread in distribution of sample values which are recovered at the receiver in respect of each OFDM carrier and altering the receiver parameters so as to cause the subsequent recovered sample values to fall into more precisely defined groups. This alteration may take the form of a change in the timing of a "block start" signal or, preferably, comprises an alteration in the frequency of a clock running at sample rate.

In preferred embodiments, where block synchronisation is achieved by steering the sample clock frequency, it is not necessary to have a separate sample clock synchronisation step.

Where a separate sample clock synchronisation is required or desired this may be obtained by evaluating how the rate of change of phase of the samples with time varies from one OFDM carrier frequency to another (eliminating from the consideration those phase changes that are attributable to the value of the data bits modulating the respective OFDM carriers).

It is preferable that the method chosen for evaluating the "spread" of received sample values for each OFDM carrier should be independent of any frequency error that there may be arising from differences between the frequencies of the various local oscillators used in the receiver compared with the corresponding frequencies used at the transmitter. In preferred embodiments of the invention this is achieved by evaluating the sample spread looking at the variation in sample position in the radial direction only. Additionally, reductions in processing may be achieved by assessing sample spread in respect of only a subset of the OFDM carriers, rather than for all of the carriers of the received signal.

It is further preferred that the technique for evaluating "spread" of samples should give an indication of the direction in which the receiver parameters should be changed in order to improve the block synchronisation. An advantageous method of achieving this is to assess the "spread" of samples when the block start position is early compared with the receiver setting, to assess the "spread" of samples when the block start position is late compared with the receiver setting and to subtract the "late" value from the "early" value. The resultant measure indicates how far away the receiver setting is from the true block start position and indicates the direction in which the receiver setting departs from the block start position.

A preferred technique for achieving local oscillator synchronisation at an OFDM receiver is to evaluate the rate of change of phase of the sample values with time for each OFDM carrier and to alter the receiver parameters to reduce or eliminate this phase change. If the receiver local oscillator is misaligned with the corresponding transmitter local oscillator then for all samples there will be a phase drift in sample location from one block to the next. There may also be a phase change from one block to the next if the sample signal modulating the relevant OFDM carrier changes from one block to the next, however the receiver can detect this gross variation and deduct the relevant multiple of 90° from the sample phase.

Again it is preferable that the evaluation of the rate of change of phase should be performed keeping processing simple. In particular, it is advantageous to evaluate the change of phase between successive blocks avoiding functions such as inverse tangents and minimising the number of divisions.

Thus according to certain preferred embodiments of the invention the change of phase from one block to the next in the demodulated sample values modulating one OFDM carrier is evaluated by multiplying one sample value by the complex conjugate of the previous sample; the imaginary part of the result corresponds to the phase difference between the two sample values. This measure is dependent on the signal level but, if greater accuracy is desired, the calculated value of phase difference may be divided by the signal level.

This method for assessing phase difference between blocks for one OFDM carrier may also be used, if separate sample clock synchronisation is being performed, during the sample clock synchronisation.

When assessing phase difference between blocks for the purpose of local oscillator synchronisation ideally the phase difference common to all of the OFDM carriers would be evaluated. However, in practice it may be sufficient to work with only a subset of the OFDM carriers. Similarly, in order to reduce the amount of processing required to maintain synchronisation (once lock has been achieved) the phase difference between two blocks may be found by comparing the phases of samples several blocks apart and dividing the phase difference by the number of blocks separating the samples.

It may be seen that the synchronisation techniques offered by aspects of the present invention involve further processing of sample values which have already been extracted from a received OFDM signal by a Discrete Fourier Transform or an Inverse Discrete Fourier Transform, this further processing preferably involving a complex multiplication step.

Brief Description of the Drawings

Further features and advantages provided by aspects of the present invention will become clear from the following description of embodiments thereof, given by way of example, and illustrated by the accompanying drawings, in which:

FIG. 2B shows an example of a differential coding device for producing signals for DQPSK modulation of OFDM carriers;

FIG. 2D shows the coding associated with the coding device of FIG. 2B;

FIGS. 3A to 3C illustrates two methods of generating an OFDM signal modulated onto a carrier;

FIG. 5(b) shows where received samples lie in practice; and FIG. 5(c) indicates how received sample values are demodulated;

Before discussing detailed embodiments of the invention it is useful to consider how an OFDM signal may be generated.

Modulation

As mentioned above, the OFDM signal can be generated using an inverse Discrete (preferably Fast) Fourier Transform, which operates on an array of complex samples in the frequency domain to produce an array of complex samples in the time domain. Preferred embodiments of the invention operate on OFDM signals in which the real parts of the frequency domain samples are constrained to take the values $+1$ or $-1$, and the imaginary parts $+j$ or $-j$. The four possible combinations of real and imaginary parts correspond to the four QPSK phase states.

Figures 1A, 1B:
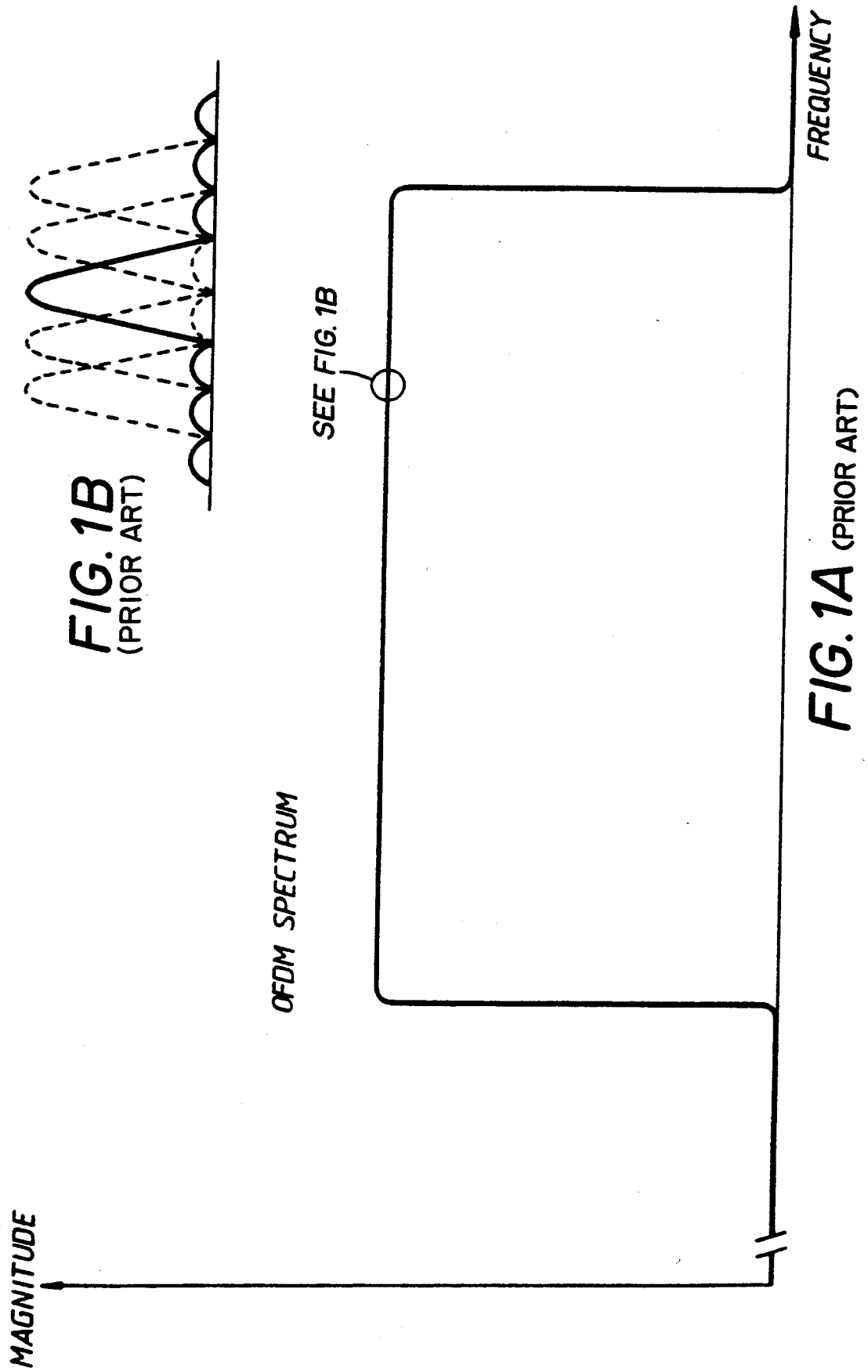
FIGS. 1A and 1B illustrates the power spectrum of an orthogonal frequency division multiplexed (OFDM) signal.
Figures 2A, 2C:
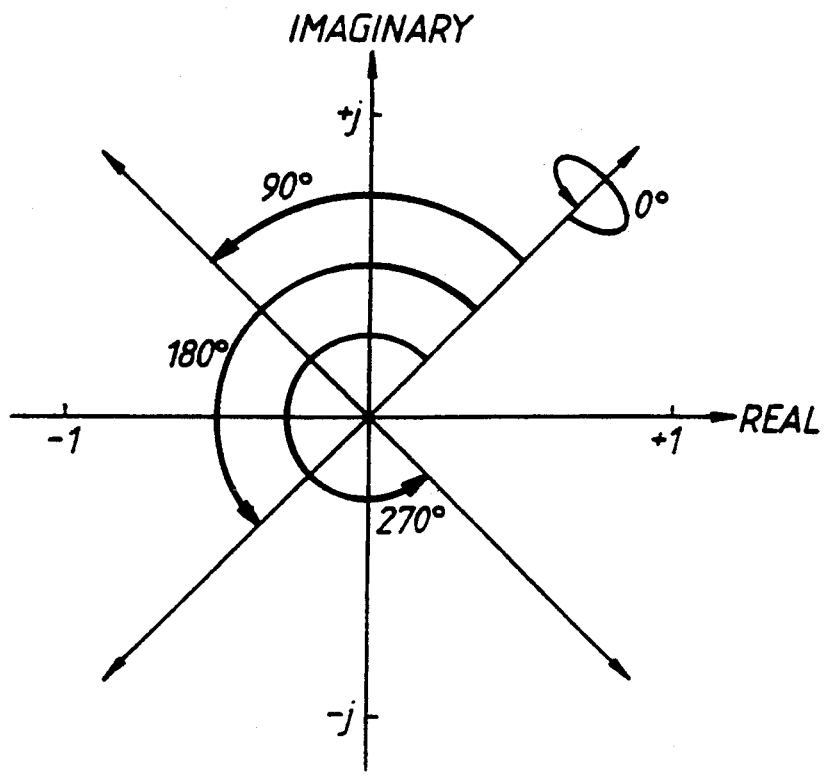
FIG. 2A illustrates a data coding used to produce differential quadrature phase shift keying (DQPSK) modulation of OFDM carriers.
FIG. 2C uses a complex vector representation to illustrate differential coding.

If the data is differentially coded (as is preferred) then it is the transitions between successive phase states which define the two data bits being coded. As shown in FIGS. 2A and 2C the four possible transitions may be considered in a vector representation to be rotations of $+0°$, $+90°$, $+180°$ and $+270°$ respectively, and each of these transitions represents a pair of binary digits (for example, as shown in the table under FIG. 2D).

An example of circuitry which could be used to generate the successive values of the complex number used to modulate one particular OFDM carrier is given in FIG. 2B.

After transformation into the time domain the signal has to be shifted up in frequency for transmission. Two possible approaches to this are illustrated in FIG. 3.

The first approach uses two modulators fed with in-phase and quadrature local oscillator signals. One modulator handles the real part of the time domain signal, the other the imaginary part. The modulator outputs are summed and after suitable filtering the signal can be transmitted.

Although this first approach is workable we have developed a second approach because it provides certain advantages.

The second approach relies on producing a time domain signal with no imaginary part. To achieve this the real part of the frequency domain signal must be even symmetrical about its centre, while the imaginary part must be odd symmetrical. This may be achieved by writing data into only half of the available space in the real and imaginary arrays and copying the data, with appropriate sign changes, into the other half of each array. At first sight it may seem that each FFT processes half as many data bits as in the first approach. In practice, however, it is possible to use each FFT to transform two sets of data at once with only a small loss in efficiency. This real signal can then be fed to a single modulator which produces a signal with two sets of sidebands symmetrical about the carrier. Since they contain no additional information, one set of sidebands can be filtered off, leaving a signal which occupies the same bandwidth per bit as the first approach.

This second approach, although slightly more complicated, has two advantages. Firstly, it simplifies the demodulator in the receiver since there is no need to accurately demodulate signals in quadrature. Secondly, there is a simple baseband version of the OFDM signal, rather than the real and imaginary signals of the first approach.

Demodulation

Figure 4:
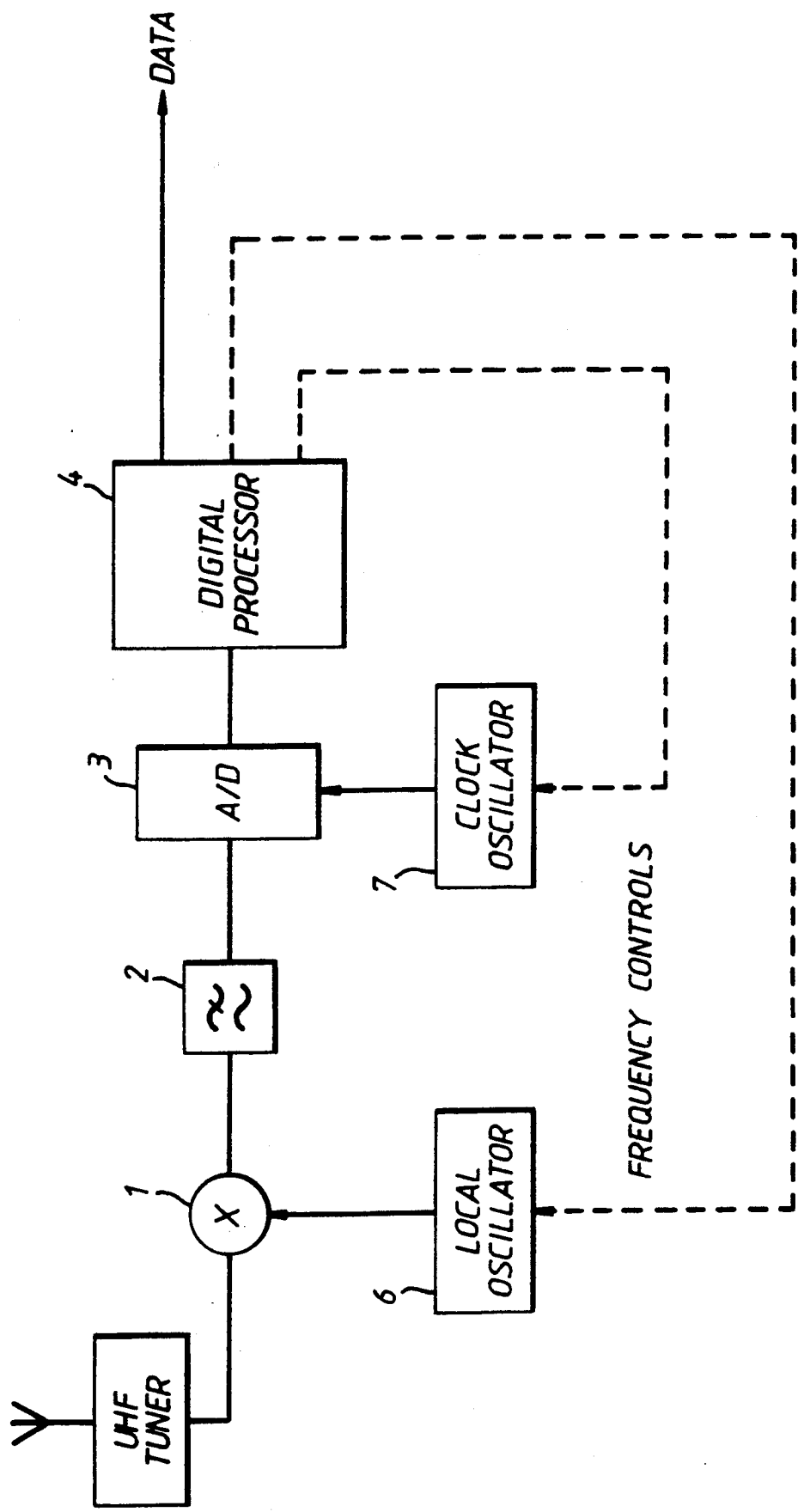
FIG. 4 shows in block diagrammatic form elements of a receiver according to a first embodiment of the invention, for receiving a transmitted OFDM signal modulating a carrier.

FIG. 4 shows a simplified block diagram of an OFDM receiver according to a first embodiment of the invention. In the discussion that follows it will be assumed that the incoming signal is a QPSK modulated OFDM signal, modulated up to the UHF band, coding a television signal. Also, in order to be concise, the described embodiment includes demodulation processing, block synchronisation and intermediate frequency synchronisation all according to aspects of the present invention, whereas in practice although all three processes may be used only one, or some subcombination, of these three processes could alternatively be used in a receiver, perhaps also with a separate clock synchronisation step.

The received signal is isolated by a UHF tuner which outputs the received OFDM signal at an intermediate frequency, IF, which in this detailed example is given as 39 MHz. The intermediate frequency signal is mixed down to baseband in a mixer 1, filtered in a filter 2 and converted to digital words by an analog-to-digital convertor 3 and a digital processing device 4.

Assuming, for the moment, that no synchronisation is required, i.e. that the receiver local oscillator, 6, and the digital sample clock, 7, are correctly locked to the transmitter at all times, and that the receiver knows the position of the start samples in each data block, then the first part of the digital processing is that the Discrete Fourier Transform (DFT) of each block is taken. The output from the DFT will be a set of complex numbers each of which represents the amplitude and phase of a received OFDM carrier (which, where QPSK modulation is used, code two data bits).

If the transmitter circuitry and transmission channel were noise-less and introduced no distortion of phase or amplitude then the set of complex numbers output from the DFT in the receiver would correspond to the values $X(n)$ used at the transmitter. However, in practice both the amplitude and the phase of each received OFDM carrier is likely to have been altered and so the complex numbers output from the DFT in the receiver will not correspond to the values $X(n)$ used at the transmitter.

The effects of noise and distortion may be illustrated by plotting the successive received sample values for a single OFDM carrier frequency against a pair of axes (Real, Imaginary). FIG. 5b shows such a plotting for an OFDM signal where the carriers are QPSK modulated.

Figure 5A:
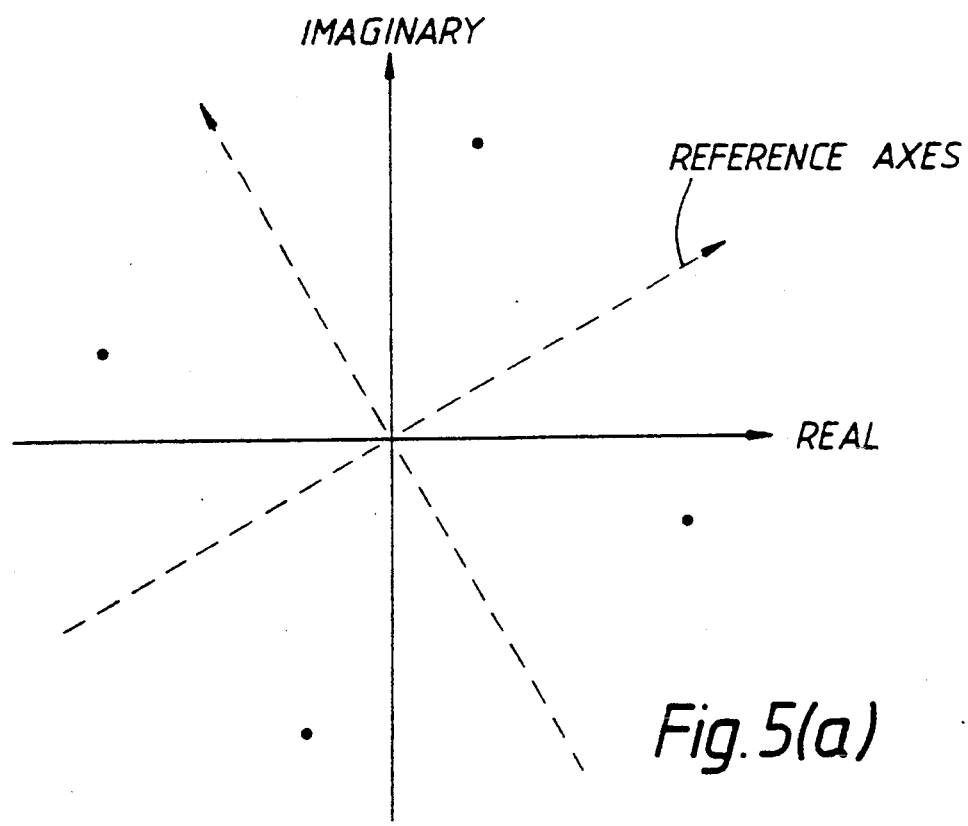
FIGS. 5(a) 5(b) and 5(c) show graphs which illustrate how the successive values found at the receiver for the signal QPSK modulating a single OFDM carrier differ from the "allowed" values used at the transmitter and indicate how the received data can be demodulated and in particular, FIG. 5(a) indicates where received samples would lie in an "ideal" transmission/reception system.
Figure 5B:
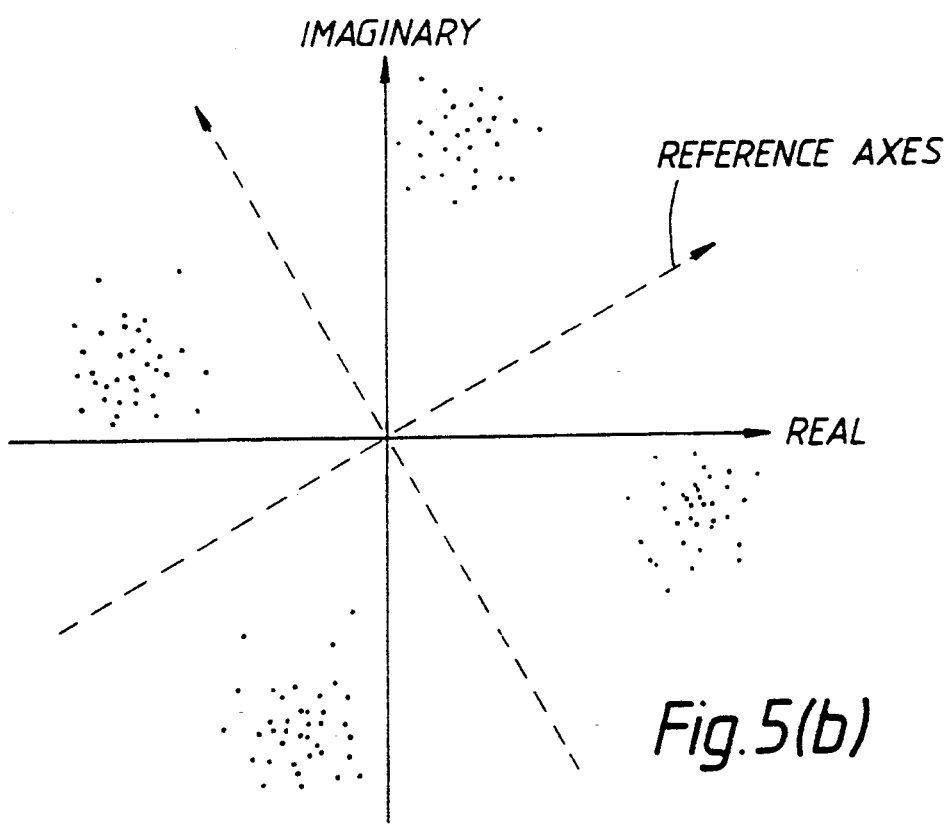

In an "ideal" transmission/reception system each of the received samples would lie in one of four positions spaced 90° apart from one another and at 45° to the axes (as shown in FIG. 5a). In practice, however, the received samples fall into four groups of points (because of noise and channel distortion) and these groups will generally not lie at 45° to the axes but will be offset by some angle (because of phase changes in the channel), see FIG. 5b. It may be considered that the four groups of received samples are at 45° to a set of notional reference axes whose position must be found before the OFDM carrier can be properly demodulated.

In order to find the orientation of the notional reference axes the digital processor 4 at the receiver may assign the samples received for a given carrier frequency to one of four groups and then find the centres of the groups by averaging over many received samples. The reference axes are formed by a pair of lines through the origin which bisect the angles between the groups.

Knowing the position of the reference axes, received samples can be decoded into pairs of bits by determining which quadrant of the reference axes they lie in. There is in fact an ambiguity since there are four possible orientations of the reference axes, and which one is correct is not known. In practice, however, this does not matter if the data is differentially coded, then it is only the direction of transitions between quadrants that count. Alternatively, in embodiments where differential coding is not used and an overhead in the transmitted signal is allowed, a reference signal of known phase may be transmitted at a predetermined position or timing in the signal.

It may be seen that most of the calculations involved in demodulation are concerned with angles. At first sight these calculations appear to require use of division and inverse tangents which would entail expenditure of a large amount of processing time. However, in OFDM systems where the signals modulating the OFDM carriers are only allowed to take four different phase states for the carrier all of the calculations can be performed using comparatively simple operations (ie complex multiplication, addition and conjugation).

The relevant techniques for simplifying the demodulation calculations occurring in the digital processing unit 4 are discussed below in relation to one QPSK modulated OFDM carrier. The algorithm both demodulates samples modulating the carrier and calculates a new estimate for the location of the reference axis.

First assume that the DFT has been performed on the received signal, and let one of the received OFDM carriers be represented by $x+jy$. Let $a+jb$ be a point on the reference real axis; an example is shown in FIG. 5c.

Figure 5C:
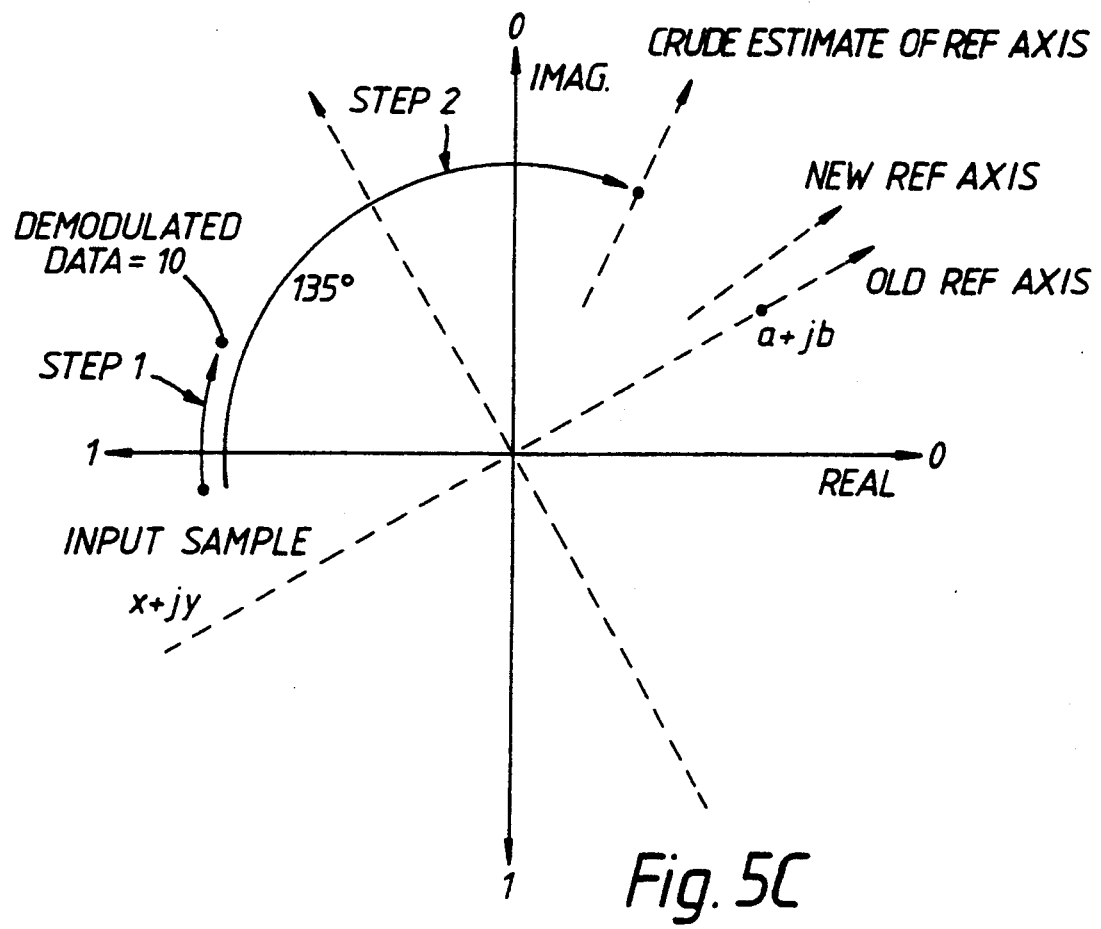

To demodulate the carrier, multiply it by the conjugate of the point on the reference axis, ie calculate $(x+jy)(a-jb)$ This is shown as step 1 in FIG. 5c and rotates the received point through an angle equal to that made by the reference axes with the true axes. Which of the four quadrants the answer lies in determines the two bits of decoded data. In other words the signs of the real and imaginary parts of this answer translate directly into a pair of bits, a convenient coding where twos complement arithmetic is being used is as follows:

| real part | im. part | data' |
|---|---|---|
| + | + | 00 |
| − | + | 10 |
| − | − | 11 |
| + | − | 01 |

(For differentially coded data it is the transitions between successive values of this data' which define the desired data to be demodulated, see FIG. 2A).

In the cases where the OFDM carriers are QPSK modulated, or DQPSK modulated, the above process yields the desired data. However, in cases where the sample values modulating the OFDM carriers can have different amplitudes, while only taking one of four allowed phases, there are additional data bits still to be found (by evaluating which of the allowed amplitudes the sample values take).

The next stage is to determine a new estimate for the reference axis. The input sample $x+jy$ is rotated clockwise about the origin 45, 135, 225 or 315 degrees according to which quadrant of the old reference axes it lies in (step 2 in FIG. 5c). This can be conveniently performed by a multiplication selected from the table below:

| If the demodulated data is | multiply $x + jy$ by |
|---|---|
| 00 | $1 - j$ |
| 10 | $-1 - j$ |
| 11 | $-1 + j$ |
| 01 | $1 + j$ |

The result of this operation can be regarded as a crude estimate of the reference axis position based on the current input sample only. A better estimate can be calculated as follows: new estimate=a(crude estimate)+(1−a) (old estimate) where a is less than one, say 0.1.

The above-described demodulation process for each of the OFDM carriers involves only a handful of complex multiplications and additions.

Synchronisation

In principle sufficient information is contained within the OFDM signal to enable complete synchronisation between transmitter and receiver without recourse to special sync signals. This can be achieved with a minimum of two feedback paths as shown in dashed lines in FIG. 4.

There are really three separate synchronisation tasks that may be involved:
1) block synchronisation;
2) clock synchronisation; and
3) local oscillator synchronisation.

These synchronisation tasks will be discussed in relation to an OFDM system having the parameters set out in table 1 below:

TABLE 1

| Example parameters for an OFDM receiver | |
|---|---|
| Time domain | |
| Time domain sample clock | 16 MHz |
| Time domain samples/block | 1024 |
| Time / block | 64 µs |
| Data rate / carrier | 15625 bits/s |
| Overall data rate | 13.5 Mbit/s |
| Frequency domain | |
| FFT size | 1024 complex points |
| No. of carriers Used | 864 (Note 1) |
| Set to zero | 160 |
| | 1024 |
| Modulation scheme | Differential QPSK |
| Data bits per FFT (Note 1) | 864 |
| Data bits / carrier | 2 |
| Channel width | 8 Mhz |
| Active signal width | 7.46875 Mhz |

Note 1 The frequency domain data blocks are organised with appropriate symmetry to ensure that the time domain signal has no imaginary part. This requires that each data symbol modulates two carriers within the FFT block. One of each pair of carriers is removed by analogue filtering at the transmitter.
Note 2 A number of OFDM carriers are set to zero in order to avoid interference as described in International patent application PCT/GB91/00513.

Before discussing in detail how different types of synchronisation are obtained and maintained at a receiver in preferred embodiments of the invention it is helpful to consider the three main types of synchronisation that may be required.

1) Block synchronisation

The time domain blocks consist of 1024 samples, and are transmitted without gaps. To optimally decode the data, the receiver must be able to find the position of the block boundaries.

To understand how it can do this, first consider the case of perfectly aligned blocks (i.e. the receiver correctly recognises in the received signal the boundaries of the blocks of data which were subjected to an (inverse DFT at the transmitter) received through a noiseless channel. In this case received samples will lie in one of four positions as shown in FIG. 5a. If, however, the blocks are slightly misaligned there will be interference between blocks, giving an effect very similar to noise. Successive received samples will be distributed around the four original positions as shown in FIG. 5b. Thus, it is possible to obtain a measure of the block misalignment of the receiver by considering how dispersed the sample values are in these groups.

2) Clock synchronisation

This refers to locking the receiver and transmitter sample clocks. Since the number of samples per block is fixed, clock synchronisation and block sychronisation are directly related. Strictly, it may not be necessary to maintain clock synchronisation at all. In asynchronous systems such as a packet system it could be acceptable to occasionally drop samples or insert extra ones to maintain block sync alone. The inherent stability of the crystal oscillators which are likely to be used to generate the necessary clock frequencies is such that this need only happen infrequently.

If clock synchronisation is required, one possibility is for the receiver to maintain block sync by steering the frequency of the receiver sample clock. Thus the receiver and transmitter clocks are automatically frequency locked. This combined approach to block and sample clock synchronisation is the currently preferred approach.

Figure 6A:
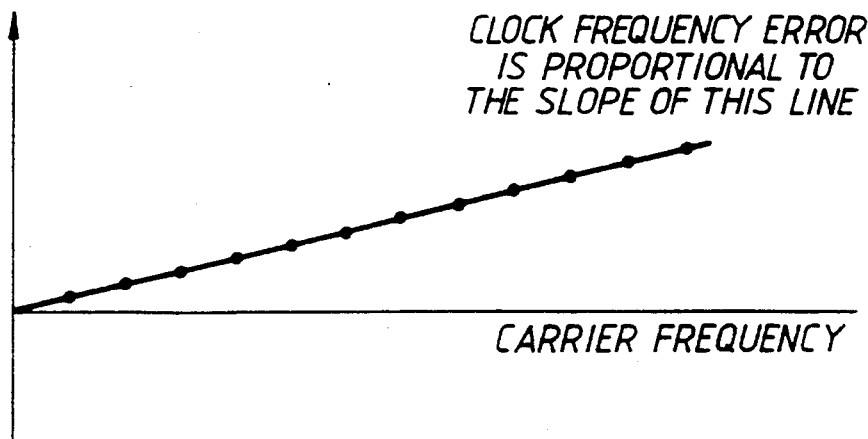
FIGS. 6(a) and 6(b) show graphs which illustrate how lack of proper synchronisation affects the received sample values; and wherein FIG. 6(a) indicates how error in synchronisation to clock frequency affects received samples, and FIG. 6(b) indicates how error in synchronisation to a UHF carrier signal frequency combined with error in synchronisation to the clock frequency affects received samples.

An alternative method is to examine the phases of the received carriers. Any frequency error in the sample clock will cause the carrier phases to change from one block to the next, which in a complex vector representation amounts to causing the reference axes to rotate, the rate of rotation increasing linearly with carrier frequency. This implies that if the rate of rotation is plotted against carrier frequency (see FIG. 6a) the slope of the resulting straight line can be used to control the frequency of the receiver clock oscillator. To make a second order phase locked loop this signal must first be integrated twice.

Note that for the frequency stabilities which are easily achievable with crystal oscillators, the rates of rotation are not large. For example, with 1024 carriers per block and a frequency error of 1 part in $10^5$, the highest frequency carrier will rotate through 1.8 degrees per block.

3) Carrier synchronisation

For transmission, the OFDM signal may be modulated, for example, up to UHF. Since the overall OFDM signal in this example is likely to be suppressed carrier single sideband (see Table 1 and note 1) the receiver is faced with the problem of recovering a carrier from the OFDM signal alone.

In theory, with a sufficiently accurate receiver local oscillator no separate synchronisation step is required. Difficulties arise, however, because larger frequency errors (in particular multiples of the OFDM carrier spacing, 15.625 Khz in this example) can cause a false lock condition. This implies that a highly accurate UHF local oscillator frequency is required. During lock up the maximum tolerable error is about 2 Khz, corresponding to a required UHF carrier frequency accuracy of just over 2 parts per million at 860 MHz. This is probably just achievable at reasonable cost in domestic equipment.

If there is an error in carrier synchronisation then there will be a small frequency error in each OFDM carrier, of the same size in each case. Thus for a small frequency error, the phases of all the QPSK carriers will be seen to change by a constant amount from block to block.

Figure 6B:
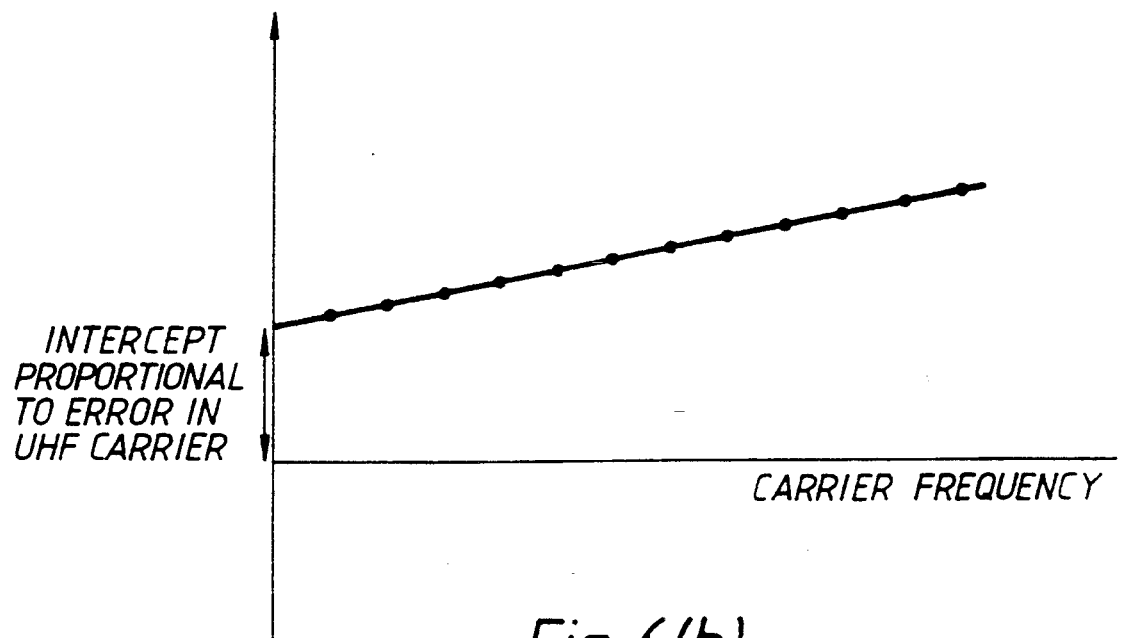

FIG. 6b shows a plot, as before, of carrier frequency against change in phase. In the case shown there is an error in the frequency of both the UHF carrier (receiver local oscillator) and the receiver sample clock. As before the slope of the line is a measure of the error in sample clock, while the vertical intercept of the line measures the error in UHF carrier frequency. The vertical intercept value could thus be used as an AFC control signal. In the embodiment of FIG. 4 such a control signal could be used to modify the frequency either of the UHF local oscillator or of the intermediate frequency local oscillator. In practice, since the UHF local oscillator is adapted to operate over a wide range of frequencies, it is simpler to alter the frequency of the intermediate frequency local oscillator.

Lock acquisition

The above discussion has been primarily about maintaining lock. In an embodiment in which all three types of synchronisation are being controlled the process of lock acquisition is very difficult to analyse because of interactions between the three different kinds of lock. Practical experience, however, has shown that the system does acquire lock without significant penalty due to the simultaneous operation of more than one loop.

In the presently preferred embodiment, where block synchronisation is achieved by steering the sample clock frequency and the evaluation of error in block synchronisation is independent of frequency errors in the receiver local oscillator(s), block lock can be acquired before local oscillator lock has been acquired. In these circumstances, and when each of the synchronisation systems has different operating parameters depending on whether it is obtaining lock or acquiring lock, the block synchronisation system can adopt its "lock maintenance" parameters while the local oscillator synchronisation system is still using its "lock acquisition" parameters.

Block Synchronisation in Detail

As mentioned above the degree of block misalignment may be measured by evaluating how dispersed around the allowed values are the sample values demodulated from an OFDM carrier.

Figure 7:
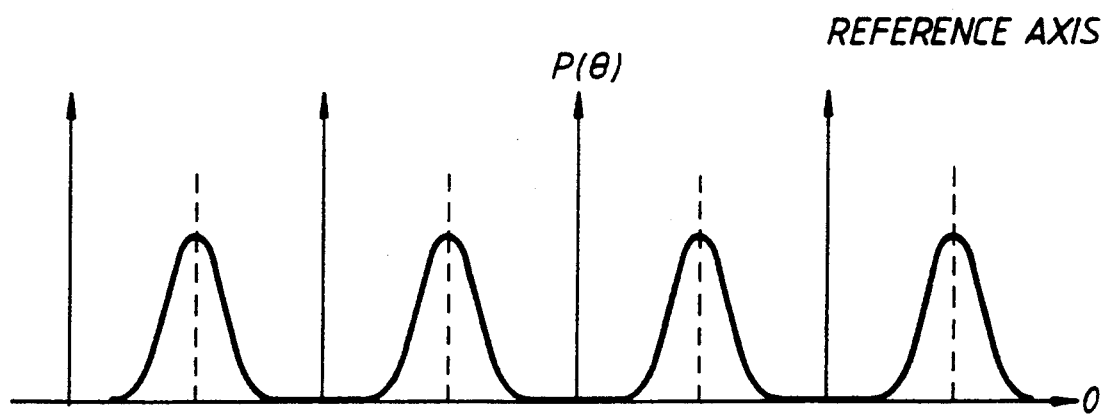
FIG. 7 illustrates a typical distribution of the phase of received sample values with respect to reference axes, for a single OFDM carrier frequency.

One way of evaluating the extent of the dispersion of the sample values is, for any individual carrier, to make a statistical plot of the angle the received points make with the axes (this will have four peaks as shown in FIG. 7). As block alignment worsens, the width of these peaks increases. Thus the receiver could be adapted to maintain synchronisation by adjusting the block position (i.e. by adjusting the location of the portion of the received signal which is fed to the DFT circuitry) so as to minimise the width of the peaks.

Another way of evaluating the dispersion or "spread" of the samples is to consider the variation in sample position from one block to the next in the radial direction only. This method has the advantage of being independent of any frequency error in the received OFDM carrier (such as would arise from sample clock frequency error or local oscillator frequency error).

A useful way of assessing sample variation in the radial direction measures the change in sample radial position from one block to the next, rather than averaging sample radial position over several blocks. It is preferred to assess the spread of sample values by evaluating a measure similar to the variance (over a number of OFDM carriers) of the change in sample radial position from one block to the next. The other typical measure of variability, standard deviation, involves calculation of a square root which would substantially increase the complexity of the processing.

In order to reduce the effect of noise, and to avoid the possibility of one particular OFDM carrier of interest being affected by an interfering tone, it is preferable to include several OFDM carrier frequencies in the calculation of sample spread. However in order to keep the required processing within bounds it may also be preferable not to include all of the carriers. Using the example given in Table 1, where there are effectively only 432 sample points per block (see Notes to table 1), a reasonable measure of sample spread may be obtained by seeing how 128 sample points vary from block to block. It is believed to be acceptable to use fewer OFDM carriers in the calculation. In this example potential difficulties may be avoided by selecting OFDM carriers for use in the calculation which are away from the spectrum edges and holes made in the spectrum.

The preferred measure of sample spread may be expressed mathematically as in equation (1) below:

$$\sum_n \frac{|(Re_{n,m})^2 + (Im_{n,m})^2 - (Re_{n,m-1})^2 - (Im_{n,m-1})^2|}{\sum_n ((Re_{n,m})^2 + (Im_{n,m})^2)}$$

where $Re_{nm}$ is the real and $Im_{nm}$ the imaginary part of the nth OFDM carrier during the mth block, and n takes values so that the sum is evaluated over the selected subset of carriers.

The calculation does involve a division step but this is only one division per block and so does not unduly complicate the signal processing. Also, the division ensures that the measure of signal spread is not affected by the relative amplitudes of the various OFDM carriers.

It is not necessary for the calculation of signal spread to be performed each time a new block is received at the receiver. Block synchronisation may be obtained and maintained by evaluating signal spread for one block and then skipping several blocks. With the example of Table 1, 15625 blocks per second arrive at the receiver. In laboratory conditions block synchronisation was achieved using approximately 244 blocks per second, i.e. one evaluation of signal spread was performed per 64 received blocks. In a practical receiver, where transitory channel changes (e.g. caused by a plane passing overhead) should be accommodated, it would be advisable to make the evaluation more often.

The calculated measure of signal spread may be used to control the operating parameters of the receiver which govern the selection of the portion of the received signal to be subjected to an FFT or IFFT. These operating parameters may take different forms. For example, the receiver digital processor may receive or generate a "block start" trigger signal which initiates the taking of the FFT or IFFT. Alternatively, the digital processor setting may be adapted to be varied by altering the sample clock frequency fed thereto.

The above-described techniques for evaluating "spread" of samples do not give an indication of the direction in which the receiver parameters should be changed in order to improve the block synchronisation.

Using the width of the peaks in FIG. 7, or the value calculated from equation (1), as a measure of the degree of misalignment of the blocks gives no information about the direction of block misalignment, a "hill climbing" algorithm is required. In a practical system this will result in the block alignment jittering backwards and forwards about the optimum position. With careful choice of sync algorithm, however, this could cause a negligible increase in bit error rate.

However it is possible to obtain a measure which indicates both the degree of misalignment and the direction in which receiver parameters should be changed to improve block synchronisation. This may be done by assessing the "spread" of samples when the block start position is early compared with the receiver setting, to assess the "spread" of samples when the block start position is late compared with the receiver setting and to subtract the "late" value from the "early" value.

DESCRIPTION OF THE PREFERRED EMBODIMENTS

DETAILED DESCRIPTION

Figure 8:
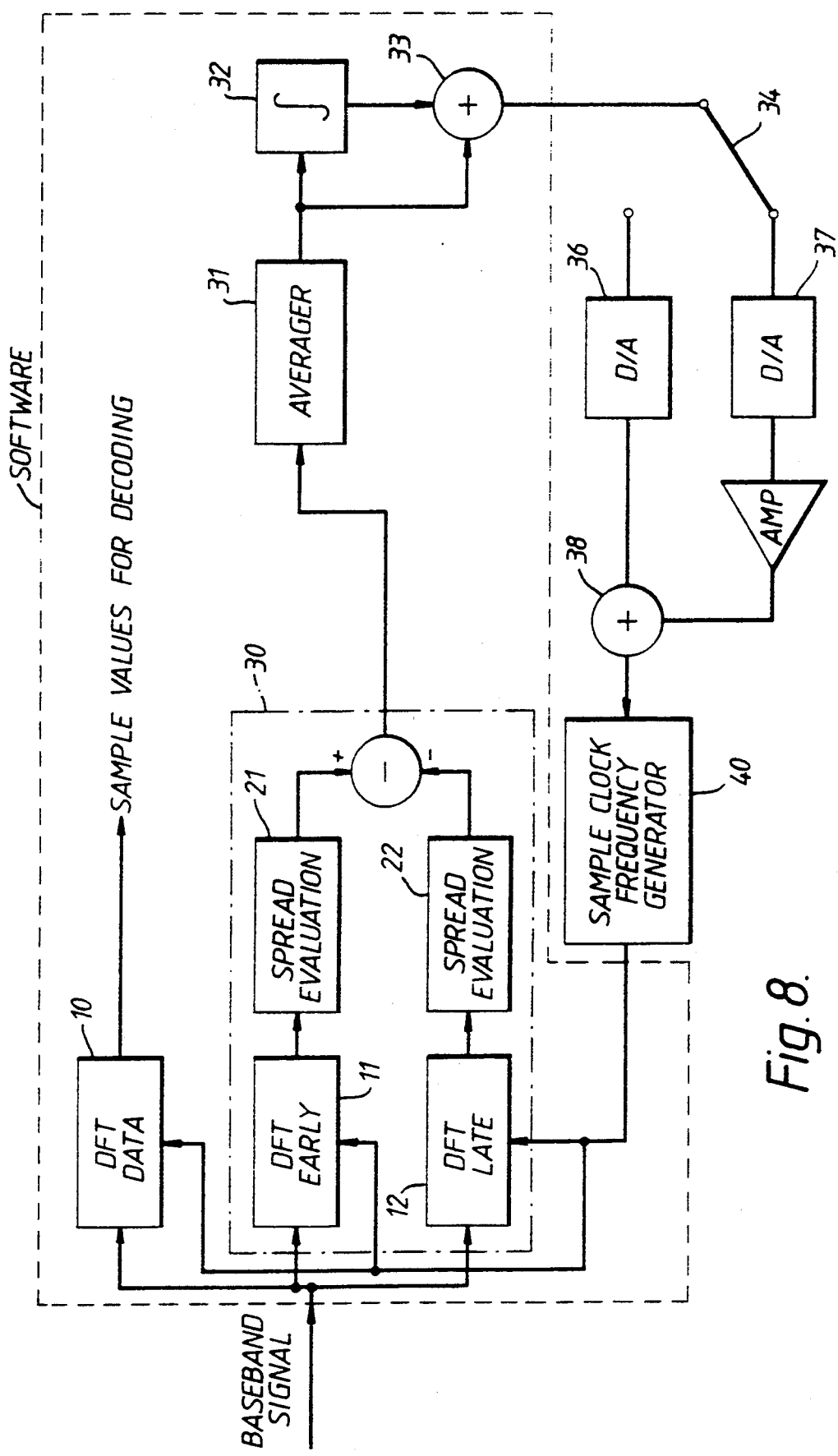
FIG. 8 shows in block diagrammatic form a preferred embodiment of block synchronisation elements for an OFDM receiver.

FIG. 8 illustrates the structure of a preferred embodiment for the block synchronisation portion of an OFDM receiver.

This embodiment uses a comparison of "early" and "late" assessments of sample spread to provide a signal indicating the degree of block misalignment and the direction in which the receiver parameters should be changed to correct the misalignment. The block start position is steered by altering the sample clock frequency such that a single synchronisation process is used to achieve both block and sample clock synchronisation. The control of the sample clock frequency and phase is performed using a second order phase locked loop (PLL).

As indicated in FIG. 8, block synchronisation is performed in this embodiment by a mixture of software and hardware.

Figure 9:
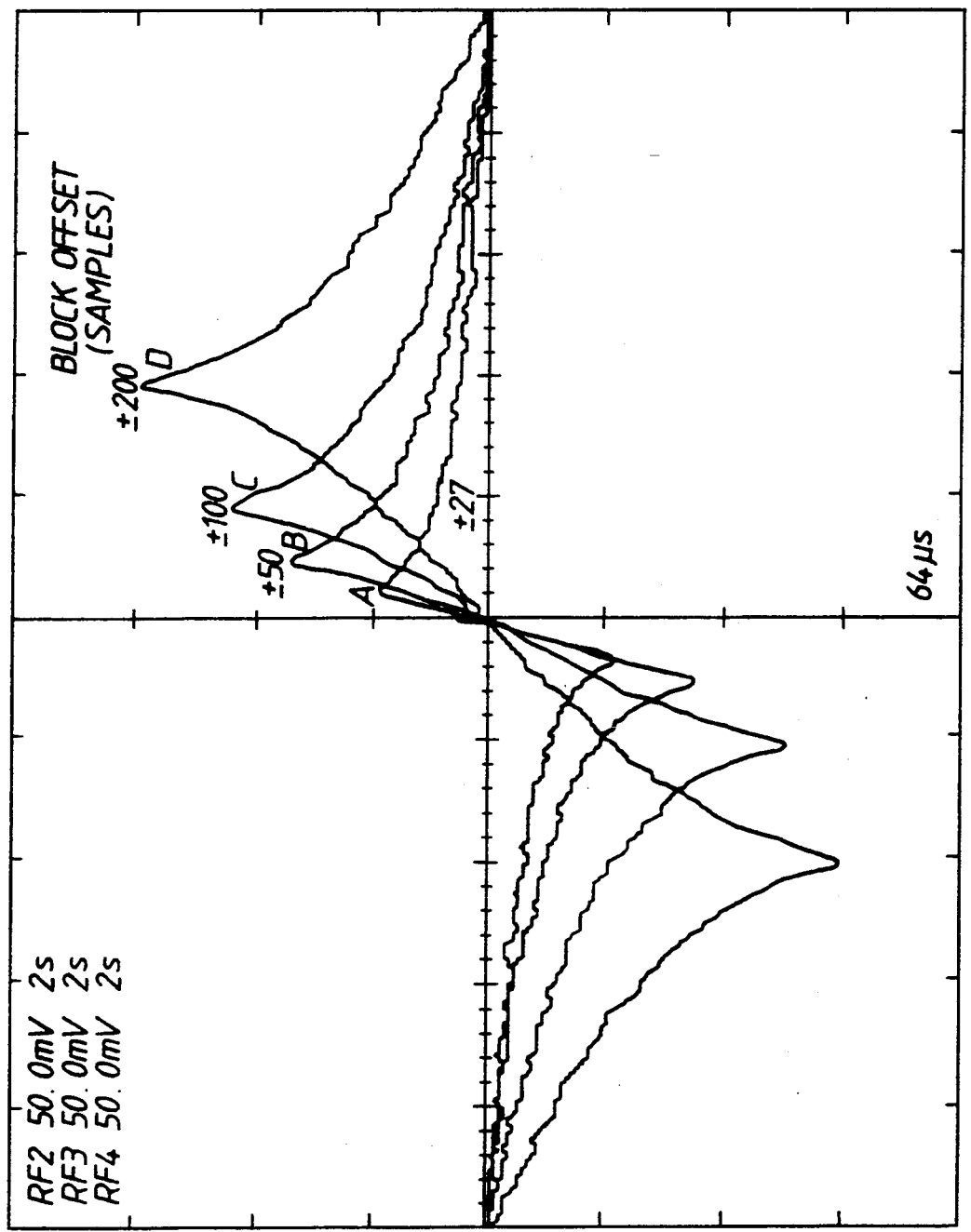
FIG. 9 shows graphs of the characteristic of the phase sensitive detector of FIG. 8 for different phase locked loop settings.

The characteristic of the phase sensitive detector 30 for different time differences (different "block offsets", measured by numbers of sample positions) between the "early" and "late" assessments of sample spread is shown in FIG. 9.

When seeking to acquire lock it is useful to use a wider loop bandwidth (and a corresponding characteristic of the phase sensitive detector, such as D) in order to achieve an improvement in synchronisation even if the original block misalignment is great. However when lock has been achieved it is better to use a small loop bandwidth (and a corresponding phase sensitive detector characteristic, such as A) in order to rapidly iron out the relatively small block misalignments which occur. This is made possible in the detailed example shown in FIG. 9 by altering the position of the switch 34 when lock is considered to have been reached. It is not essential that there should be two different loop settings with a switch between them, the change in loop setting could be effected gradually as synchronisation improves.

Clock Synchronisation in Detail

As mentioned above it is preferred not to have a separate clock synchronisation step. However, if it should be desired to have a separate clock synchronisation step then the detailed technique for evaluating the rate of drift of carrier phase with frequency should be performed as described below in respect of local oscillator synchronisation. The phase change information resulting from performance of these techniques would then be processed to find how much the phase change per block varies from one OFDM carrier frequency to another. This gradient information is a measure of sample clock frequency error and could be used to control the sample clock frequency.

Local Oscillator Synchronisation in Detail

As mentioned above a preferred technique for achieving intermediate frequency synchronisation involves making an evaluation of the change of phase between successive blocks common to all of the OFDM carriers (omitting from the consideration the phase changes attributable to the value of the data bits modulating the respective OFDM carriers) for example by using the technique of rotating all samples into the same quadrant, as with the estimates of the reference axis positions).

In order to avoid complicated and lengthy processing steps it is advantageous to evaluate the phase change between successive samples modulating an OFDM carrier by multiplying one sample value by the complex conjugate of the previous sample value; the imaginary part of the result corresponds to the phase difference between the two sample values When assessing phase difference between blocks for the purpose of local oscillator synchronisation ideally the phase difference common to all of the OFDM carriers would be evaluated so as to reduce the effects of noise. However, in practice it is sufficient to work with only a subset of the OFDM carriers.

The value for the phase difference common to the carriers in the block produced by the above-mentioned complex multiplication method is partially dependent on signal level. As in the case of the preferred measure of block misalignment, this dependence may be removed by dividing the evaluated measure by the signal amplitude at the expense of introducing one division step per block.

The preferred measure of phase difference common to the OFDM carriers in the block may be expressed mathematically as in equation (2) below:

$$\frac{\sum_n Im(Z_{n,m} \cdot Z^*_{n,m-1})}{\sum_n Re(Z_{n,m} \cdot Z^*_{n,m-1})}$$

where $Z_{n,m}$ represents the complex sample from the nth carrier in the mth block, after resolving the ambiguity due to the presence of modulation. As previously set forth, n takes values so that the sum is evaluated over the required subset of carriers.

Again, as with the preferred embodiment of block synchronisation elements, it is advantageous to use different operational parameters when acquiring local oscillator synchronisation lock and when maintaining that lock. In this case, it is convenient to alter the number of blocks separating the samples whose phase is being compared, in other words when acquiring lock the phase difference between samples in successive blocks m-1 and m is evaluated, whereas once lock has been acquired the phase difference is calculated between samples several blocks apart and then this value is divided by the number of blocks separating the samples. The change of operational parameters need not be a sharp switching but may be a gradual change as local oscillator synchronisation improves.

Figure 10:
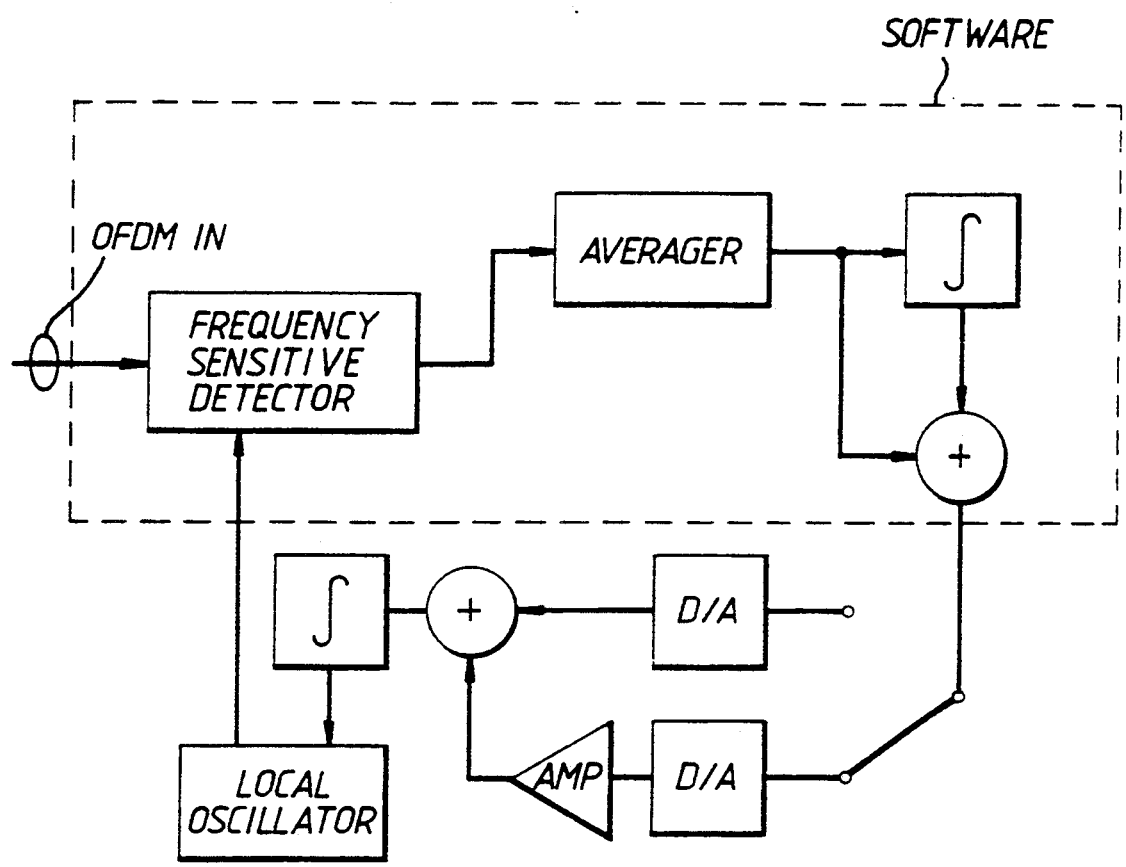
FIG. 10 shows in block diagrammatic form a preferred embodiment of local oscillator synchronisation elements for an OFDM receiver.

FIG. 10 shows in block diagrammatic form an example of local oscillator synchronisation elements employing the above-described preferred features.

The embodiment of FIG. 10 is a frequency locked loop implemented partly in software and partly in hardware.

General

Whilst the above description has been given in terms of the desired OFDM signal being generated through an inverse Discrete Fourier Transformation, it will be understood that a Discrete Fourier Transmission could equally be used (with an inverse DFT being used at the receiver to recover the data samples), or both the coder and decoder could use the same transformation (DFT, or inverse DFT) with appropriate further processing.

We claim:

1. Apparatus for receiving a signal comprising a plurality of orthogonal frequency division multiplexed (OFDM) carriers, each carrier being modulated by a signal capable of taking any of a set of allowed values corresponding to allowed states of at least one of phase and amplitude for the carrier, a set of signal values modulating the plurality of OFDM carriers during a time period T representing a block of data samples, the apparatus comprising:

means for demodulating the OFDM carriers so as to produce a set of complex samples representing the values of the signals modulating the carriers during a particular time period T;

means for estimating the location in a complex plane of reference axes constituting, for each OFDM carrier, a frame of reference against which are defined the allowed values modulating that OFDM carrier;

means for assigning an allowed modulating value to each complex sample of the set by reference to the corresponding estimated reference axes so as to produce a set of allowed values; and means for converting the set of allowed values to a recovered data stream.

2. Receiving apparatus according to claim 1, wherein the assigning means comprises means for multiplying the complex samples by a respective complex conjugate of a point on one of the corresponding estimated reference axes and means for assigning to that complex sample the allowed value closest to the product.

3. Receiving apparatus according to claim 2 for a received signal in which the received OFDM carriers are modulated by phase shift keying (PSK), wherein the assigning means is adapted to assign allowed values to the complex samples by coding the signs of the real and imaginary portions of the product produced by the multiplying means into respective bits of the allowed values.

4. Receiving apparatus according to claim 2 wherein the reference axis estimating means is adapted to revise the estimated position of the reference axes for a carrier depending on the allowed values assigned to the complex samples recovered from that carrier.

5. Receiving apparatus according to claim 2, and further comprising means for evaluating a spread of complex samples produced by the demodulating means in respect of each of one or more carriers, and means for controlling a block synchronisation of the receiving apparatus; wherein the block synchronisation controlling means is adapted in use to alter the particular time period T during which the demodulation means operates so as to reduce the evaluated spread of complex samples.

6. Receiving apparatus according to claim 5 for a received signal in which the received OFDM carriers are modulated by phase shift keying (PSK), wherein the spread evaluating means is adapted to evaluate the spread of the complex samples in the radial direction only.

7. Receiving apparatus according to claim 6, wherein the spread evaluating means is adapted to evaluate spread according to the following formula:

$$\frac{\sum_n |(Re_{n,m})^2 + (Im_{n,m})^2 - (Re_{n,m-1})^2 - (Im_{n,m-1})^2|}{\sum_n ((Re_{n,m})^2 + (Im_{n,m})^2)}$$

where $RE_{n,m}$ is the real part and $Im_{n,m}$ the imaginary part of the complex value derived in respect of the nth OFDM carrier during the mth time period T and the carriers s, s+1, . . . S are a group of OFDM carriers selected for use in spread evaluation.

8. Receiving apparatus according to claim 5, wherein the spread evaluating means is adapted to evaluate spread in respect of complex samples demodulated during a time period which is early compared with the period T to produce an early spread value, to evaluate spread in respect of complex samples demodulated during a time period which is late compared with the period T to produce a late spread value, to subtract the late spread value from the early spread value and to output the result as an indication of the spread of the complex values.

9. Receiving apparatus according to claim 5, wherein the block sychronisation controlling means is adapted to alter the period T over which the demodulation means operates by altering a receiver sample clock frequency.

10. Receiving apparatus according to claim 5, wherein the spread evaluating means forms a phase sensitive detector of a phase locked loop and the block sychronisation controlling means controls a voltage controlled oscillator of the phase locked loop.

11. Receiving apparatus according to claim 5 for a received signal in which the OFDM carriers are modulated onto a carrier, and further comprising:
a local oscillator for demodulating the received signal;
means for evaluating phase drift between different sets of complex sample values produced by the demodulating means, the phase drift evaluating means being adapted to disregard phase changes attributable to changes in the allowed values modulating the respective OFDM carriers by adjusting the complex values before assessing phase drift; and
local oscillator synchronisation means for altering the local oscillator frequency to reduce the evaluated phase drift.

12. Receiving apparatus according to claim 11, wherein the phase drift evaluating means comprises means for multiplying respective adjusted complex values by a complex conjugate of respective adjusted complex values derived for the corresponding OFDM carriers during an earlier time period.

13. Receiving apparatus according to claim 12, wherein the phase drift evaluating means is adapted to evaluate phase drift according to the following formula:

$$\frac{\sum\limits_{n=p}^{n=p} Im(Z_{n,m} \cdot Z^*_{n,m-1})}{\sum\limits_{n=p}^{n=p} Re(Z_{n,m} \cdot Z^*_{n,m-1})}$$

where Im and Re are, respectively an imaginary and a real part of the expressions in brackets, and $Z_{n,m}$ is the adjusted complex value derived in respect of the nth OFDM carrier during the mth time period and the carriers p, p+1, ... p are a group of OFDM carriers selected for use in phase drift evaluation.

14. Receiving apparatus according to claim 11, wherein the phase drift evaluating means is adapted to assess the phase change between a first set of complex values produced by the demodulating means during a first time interval and a second set of complex values produced by the demodulating means during a second time interval, said first and second time intervals being separated by a period of time several time the duration of either of the first and second time intervals.

15. Receiving apparatus according to claim 11, wherein the phase drift evaluating means forms a frequency sensitive detector of a frequency locked loop.

16. Receiving apparatus according to claim 5, and comprising local oscillator synchronisation means, the block synchronisation controlling means each being operable in a synchronisation acquisition and a lock mode, the lock mode being when receiver timing is synchronized to timing of the received signal, wherein the characteristics of the block synchronisation controlling means and local oscillator synchronisation means are adapted to alter depending upon whether synchronisation acquisition mode or lock mode is in operation.

17. Receiving apparatus according to claim 16, wherein the block synchronisation controlling means is adapted to be capable of adopting lock mode characteristic even if the local oscillator synchronisation means is still in synchronisation acquisition mode.

* * * * *